United States Patent [19]

Cosentino

[11] Patent Number: 5,103,301
[45] Date of Patent: Apr. 7, 1992

[54] SEQUENTIAL COLOR TELEVISION CAMERA HAVING IMAGE INTENSIFIER PORTION

[76] Inventor: Alfonso Cosentino, 14 Westmoreland Dr., Yonkers, N.Y. 20704

[21] Appl. No.: 429,965

[22] Filed: Oct. 30, 1989

Related U.S. Application Data

[63] Continuation-in-part of Ser. No. 178,770, Mar. 25, 1988, abandoned, which is a continuation of Ser. No. 735,856, May 20, 1985.

[51] Int. Cl.⁵ .............................................. H04N 9/07
[52] U.S. Cl. ...................................... 358/42; 358/211
[58] Field of Search .................................. 358/42, 211

[56] References Cited

U.S. PATENT DOCUMENTS

| | | | |
|---|---|---|---|
| 2,955,158 | 10/1960 | Gebel | 358/211 |
| 3,048,653 | 8/1962 | Hughes | 358/42 |
| 3,087,985 | 4/1963 | Heijne et al. | 358/44 |
| 3,467,880 | 9/1969 | Crowell | 358/44 X |
| 3,548,087 | 12/1970 | Shimada | 358/43 |
| 3,553,363 | 1/1971 | Anderson | 358/211 |
| 3,689,690 | 9/1972 | Tan | 358/42 |
| 3,710,014 | 1/1973 | Justice | 358/42 |
| 3,735,032 | 5/1973 | Goetze et al. | 358/44 |
| 3,794,408 | 2/1974 | Ian et al. | 358/42 |
| 3,812,526 | 5/1974 | Tan | 358/42 |
| 3,813,489 | 5/1974 | Ramsay et al. | 358/211 |
| 3,969,763 | 7/1976 | Tan | 358/42 |
| 4,272,782 | 6/1981 | Proper et al. | 358/167 X |
| 4,355,336 | 10/1982 | Hirschfeld et al. | 358/212 |
| 4,412,247 | 10/1983 | Horbaschek | 358/167 X |
| 4,437,111 | 3/1984 | Inait et al. | 358/211 X |
| 4,543,598 | 9/1985 | Oliphant | 358/11 |

FOREIGN PATENT DOCUMENTS

| | | | |
|---|---|---|---|
| 55-123279 | 9/1980 | Japan | 358/42 |
| 474954 | 5/1976 | U.S.S.R. | 358/42 |

OTHER PUBLICATIONS

Stern et al., Low-Light-Level Imaging-Amplifying Device with Full Colour Capability, Mar. 1974, pp. 185-189.

Primary Examiner—James J. Groody
Assistant Examiner—Mark R. Powell
Attorney, Agent, or Firm—Handal & Morofsky

[57] ABSTRACT

A high resolution color television camera system (10) for use to capture high resolution, high quality color video images under reduced lighting conditions, and without supplementary lighting is disclosed. The instant invention can operate at night using only the available light from street lamps, store signs and windows, or even the moon and stars. The output signal is fully compatible with conventional color video transmission equipment. The inventive camera system uses image intensifier camera tubes.$^{(16)}$ High quality imaging and registration of imager is achieved by generating and processing color information using a plurality of formats while achieving optimum results at the various points in the signal generation and transmission system.

12 Claims, 4 Drawing Sheets

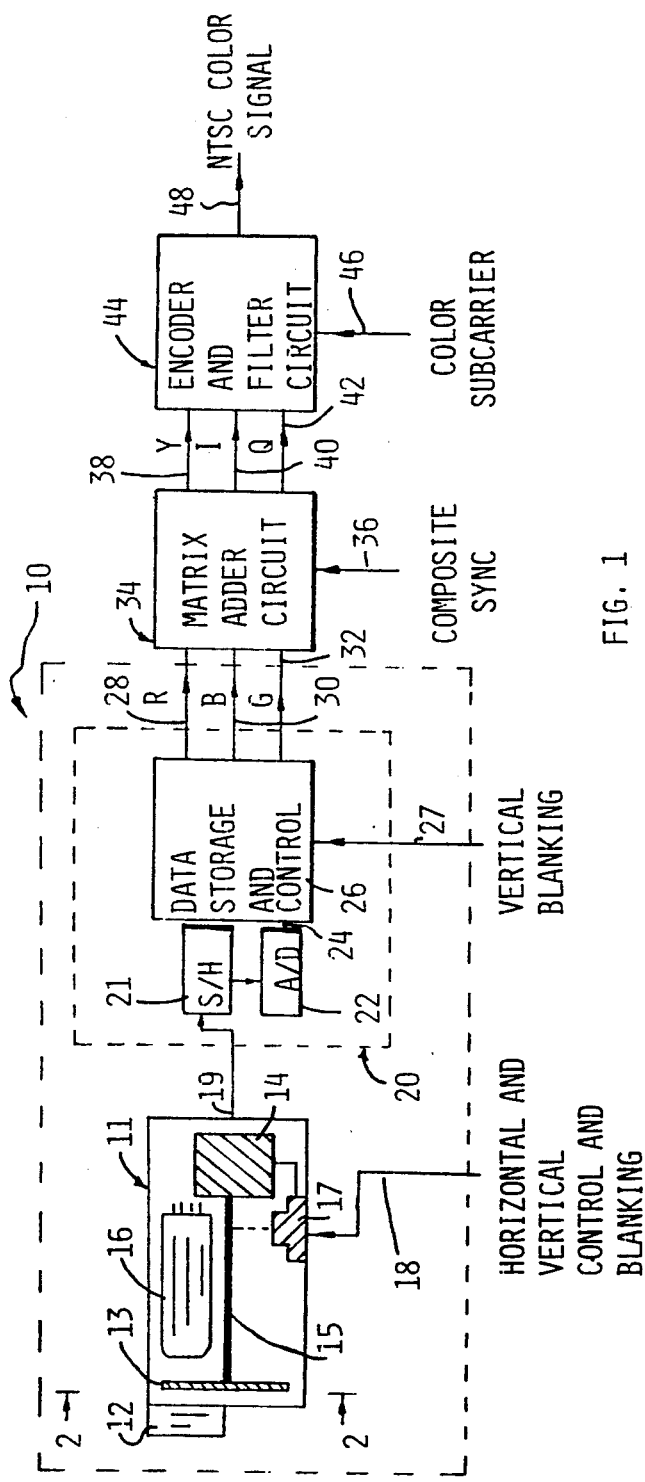
FIG. 1
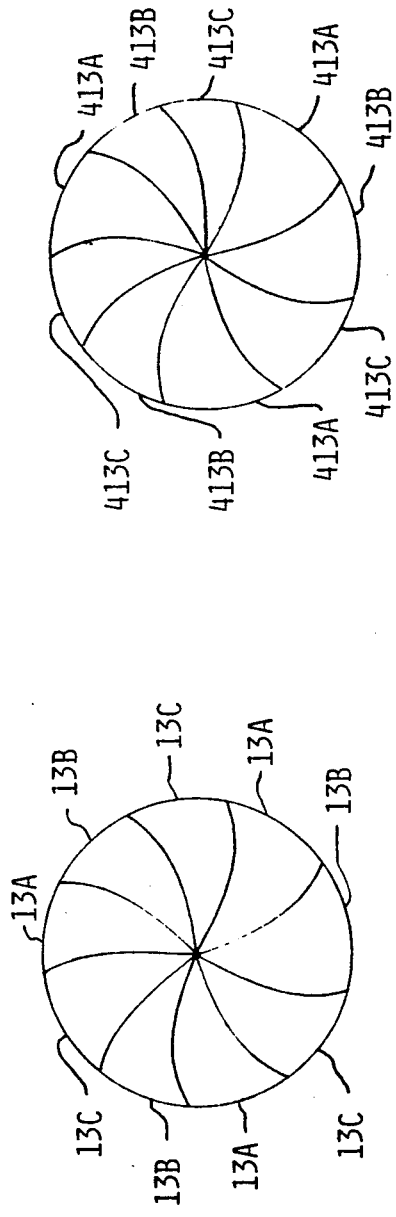
FIG. 6
FIG. 2

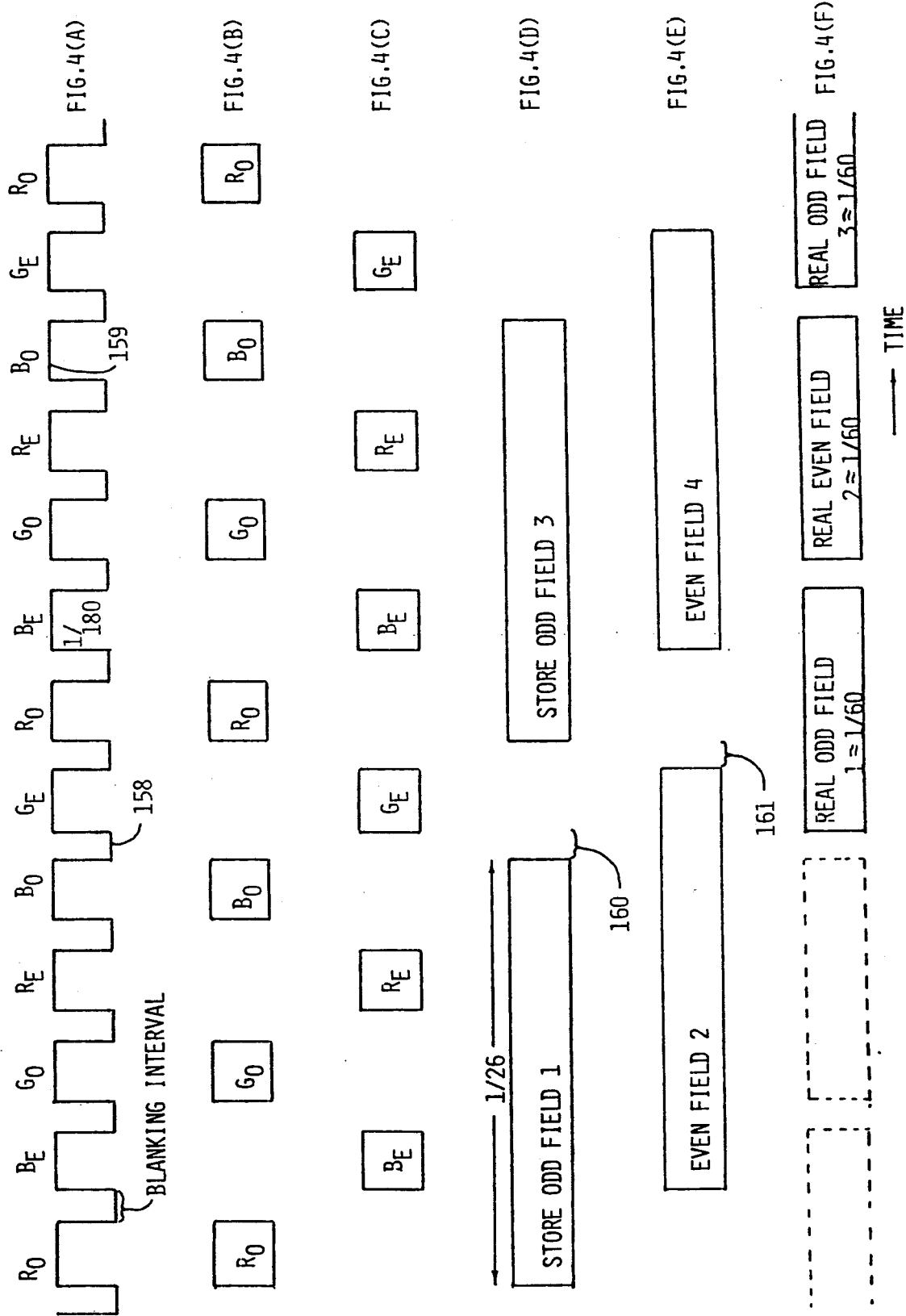

SEQUENTIAL COLOR TELEVISION CAMERA HAVING IMAGE INTENSIFIER PORTION

CROSS REFERENCE TO RELATED APPLICATION

This application is a continuation-in-part of U.S. patent application Ser. No. 178,770, filed Mar. 25, 1988, now abandoned, which, in turn is a continuation of U.S. patent application Ser. No. 735,856, filed May 20, 1985.

TECHNICAL FIELD

The invention relates to a color television camera system capable of having a high degree of intercolor registration, high resolution and low light sensitivity of particular use for capturing high resolution color video images under normal as well as under reduced lighting conditions and without supplementary lighting.

BACKGROUND OF THE INVENTION

The conventional color camera system using the 525 line NTSC format performs acceptably in the studio where highly artificial and purposely designed conditions, including high intensity lighting, are provided. Since the advent of high definition color television (HDTV), the color camera has been a major problem. The major source of this problem has been in the achievement of proper registration between colors at the high resolution necessary. It is difficult enough to register three tubes in a 525 line camera, but to register 1125 television lines in an HDTV camera is a far more difficult problem.

Indeed, even in a 525 line color camera, where the registration technique has been refined over the years because of the great numbers of television cameras that have been designed, it is still necessary to use special enhancement circuitry in order to sharpen the image because exact registration is not possible. The necessity for such enhancement can be demonstrated on any 525 line camera by simply switching off the image enhancer. Immediately, the image on the television monitor becomes quite visibly soft, as a result of the fact that perfect registration is not being achieved and the enhancer is necessary to sharpen the camera video. This problem of course becomes much worse at the 1125 television lines of HDTV. Here the camera requires extremely sophisticated and complex electronic circuitry in order to achieve the level of registration demanded by 1125 television lines. The image enhancer also requires a much higher level of performance. All these factors combine to push the cost of an HDTV camera into the six figure range.

In addition, if we consider the generation of color television pictures outside the essentially laboratory (and extremely uncomfortable) conditions of the studio, as yet unsolved problems are presented in even contentional 525 line systems. This has been so in spite of the fact that television stations frequently televise programs originating away from the studio. For instance, electronic news gathering (ENG), by its nature, takes camera crews away on location, where control over lighting conditions may be nonexistent. Poor lighting may result because of an insufficient amount of natural light or the failure or inability to provide adequate supplementary lighting. Even if supplementary lighting is provided, its effectiveness is lost at ranges further than twenty feet.

An example of a situation where the problems associated with reduced lighting conditions are confronted is the televising of a military battle at night. The employment of supplementary lighting may be forbidden or impossible. The camera crew must maintain distances much greater than twenty feet as a necessary precaution under the circumstances. In addition, there are many other situations where ENG camera crews are severely restricted by reduced lighting conditions on location.

In addition, the high levels of light in the studio and the discomfort and expense associated therewith, are a manifestation of the same problems associated with conventional cameras, although such manifestation takes a very different form, namely, instead of the inability to televise in a low light level, there are the discomforts associated with high light levels.

The conventional color camera not only limits the camera crews televising opportunities, but, due to the requirement of, albeit relatively ineffective supplementary lighting, the crew's mobility is usually hampered. For instance, the crew may require one or two additional persons to set up or carry the lighting equipment. Lighting is usually hand held and is powered by rechargeable battery packs that are secured around the waist. Since the lighting time duration is limited, a number of battery packs must be available to cover an evening's assignment. It also results in the loss of coverage of an area which is too far away for the lighting to be effective, but would produce good video pictures with a low light level camera.

In an attempt to alleviate the problems attendant to televising in poorly lighted locations, low light level black and white pickup tubes were developed. These tubes have substantially greater sensitivity to light due to the provision of a image intensifier which essentially amplifies the existing received rays of light. One would think that such a solution could be rays of light. One would think that such a solution could be directly applied to a conventional color camera, except for the fact that these devices do not preserve color information. Likewise, even if devices could be used with three monochrome cameras, the above discussed registration problems would be aggravated.

More particularly, despite the longstanding availability of low light level tubes, ENG camera crews continue to use conventional color cameras and supplementary lighting. The reason for this is that together with the increased sensitivity to light, the tubes experience a high sensitivity to stray magnetic fields, even including the earth's magnetic field. Therefore, stray external magnetic fields in a three tube cluster will result in an unacceptable geometric distortion of the light image on the tube. Such geometric distortion causes unacceptable misregistration in an array of a number of low light level pickup tubes.

To understand this, consider that the conventional color camera generates three separate and independent video signals each consisting of either a red, green or blue component of the entire televised scene. It accomplishes this by employing three camera pickup tubes, one for each signal to be generated. The process could be initiated by receiving an image from the scene to be televised through a single camera lens. The image could then be triplicated by employing beamsplitters or other optical elements between the lens and the three pickup tubes. Monochromatic color filters are disposed between the beamsplitters and each of the pickup tubes for permitting only a red, blue or green images to be received by each tube. The received images are then transformed into video signals by a raster scanned electron beam in each pickup tube. The scanning format employed in the United States is a 525-line raster at thirty frames per second interlaced two to one resulting in a field rate of sixty fields per second. The scanning occurs simultaneously in each tube, and the result is three simultaneous video signals. The system described above could be referred to as a simultaneous color television system.

To achieve maximum resolution the three images on the camera tubes must be superimposed over each other exactly. This is accomplished by employing matched beam deflection and control circuitry among the pickup tubes and also matching several characteristics of the tubes. Scanning in each of the tubes is thereby made as uniform as possible and good registration and convergence is sought.

If one considers the use of three image intensified low light level pickup tubes, instead of the conventional pickup tubes, in addition to the above problems the situation is compounded by the following additional problems caused by the image intensified pickup tubes. Due to their high sensitivity characteristics, low light level tubes experience individual variations in their response. In addition, the image intensifier is highly susceptible to external magnetic fields, including the earth's magnetic field. Still further, it is noted that due to their increased sensitivity to magnetic fields and different positions in the array, resulting geometric distortion is different in each tube. Therefore, the level of color registration by arraying low light tubes together would be quite limited. Moreover, the fabrication of a low light level camera system by the employment of existing low light level technology in the classical color camera configuration has not been employed, and ENG and other industries continue to use other techniques, despite their drawbacks.

In an attempt to address these problems, about two years ago, Sony Corporation of Japan introduced a low light level color camera. The camera was tested on some shows that were televised outdoors at night using no artificial illumination but has not been accepted due to insufficient low light capability, poor resolution (under 400 television lines) and poor signal-to-noise ratio.

The Sony camera operates by using three camera sensors with an intensifier on each. However, the intensifier gain is limited to a maximum of ten, in order to achieve a reasonable degree of registration. As noted above, even with this low intensifier gain, registration was low, leaving much to be desired. In addition, the output of the intensifier converted the election image to a visible light image on a phosphor screen and then was coupled directly to the faceplate of the image sensor, resulting in poor resolution and poor signal-to-noise ratio.

Yet another approach to the provision of a full color television signal is disclosed in an article entitled Low-Light-Level Image-Amplifying Device with Full Color Capability by Stern et al published in the Journal of the Society of Motion Picture and Television Engineers, Volume 83, No. 3 which discloses a light amplifier. Here, means are provided for generating a bright full color phosphorescent image which is photographed using a motion picture film camera. While this article does mention the possibility of using a television camera instead of the motion picture camera, nothing further is said in this regard and the problem of intercolor registration is not addressed. However, the authors do note several other problematic aspects of the system, including, color distortion due to phosphor characteristics, sensitivity losses due to the use of two synchronized color filter wheels, and mechanical syncchronization of two color filter wheels with diametrically opposite filter configurations and which therefore cannot even rotate about the same axis.

DISCLOSURE OF INVENTION

The claimed invention is intended to provide a remedy. It solves the problem of how to provide high resolution, and low distortion color video images both under low light level conditions and under normal lighting conditions without the need for high intensity special lighting or the mechanical intricacies and color distortions of a light amplifier. It also has the advantage of using existing camera tubes, and does not require the use of additional electronic or other equipment at the various points in the transmission system. Particularly, the invention, as claimed, employs the existing technology of low light level camera tubes with image intensification and electronic processing. The inventive camera system preserves all of the advantages of existing low light level technology, while eliminating its disadvantages, and adding color while at the same time providing a high definition color television signal of high quality even without resolution enhancing signal processors.

Compared to other systems, the above-described, the Sony camera is about three F stops faster than a standard ENG camera used by the networks. The inventive camera is about ten F stops faster than the standard color camera, and has substantially higher resolution and signal-to-noise ratio than the Sony camera.

The technology used in the inventive low light level color camera makes the production of an HDTV camera relatively advantageous both from an engineering viewpoint and from a cost basis. It also results in a camera with a higher resolution potential.

Without additional costs, the camera can output digital video in R-G-B format directly if desired. This is very important to future digital television applications. The digitized video can be easily encoded to assure no accessibility to a classified image transmission. The inventive system would allow one to encode the digital video and send down classified imagery during flight of, for example, the Space Shuttle. Thus, military uses are another possibility.

The inventive system is also applicable to vacuum tube and solid state sensors. For example, already developed image intensifiers coupled to a CCD imager can also be used in the inventive system.

The inventive technology also enables the camera to be used in a fibre optic transmission system, using a digital modulator with an LED output into a fibre optic system.

It is also possible to use a super high resolution sensor for any medical or other application requiring extremely high resolution and provide it for viewing on a very high resolution monitor.

Since the present technology uses only one sensor, no registration is necessary. This eliminates all the sophisticated registration circuitry, and the costly image enhancer as well. This allows the full resolution capability of the camera sensor to be obtained. The resolution of the inventive system will thus be better than the conventional HDTV camera. Moreover, the inventive system does not require an image enhancer. Due to these factors, the cost of the inventive HDTV camera will be much less than the three-tube camera.

The invention, as claimed, includes a camera head comprising a pickup tube optically associated with a known camera lens to receive, read and transform images at a predetermined field rate. Means are provided for differentiating between red, blue and green components of the image. Each color image is read and transformed by a low light level pickup tube to produce a red, blue and green video signal. These signals are processed according to the claimed invention, into a conventional television signal. This signal is made available at respective outputs for further processing by matrix adding and coding circuitry as in a conventional color camera system. The final encoded signal may be routed from the inventive camera system to a transmitter for transmitting.

BRIEF DESCRIPTION OF DRAWINGS

One way of carrying out the invention is described in detail below with reference to drawings which illustrate only one specific embodiment of the invention, in which:

FIG. 1 is a general block diagram of the inventive low light level camera system;

FIG. 2 is a view along lines 2—2 of FIG. 1;

FIGS. 4A to 4F are timing diagram for the system of FIG. 3;

FIG. 6 illustrates an alternative color wheel; and

BEST MODE FOR CARRYING OUT THE INVENTION

Figure 3:
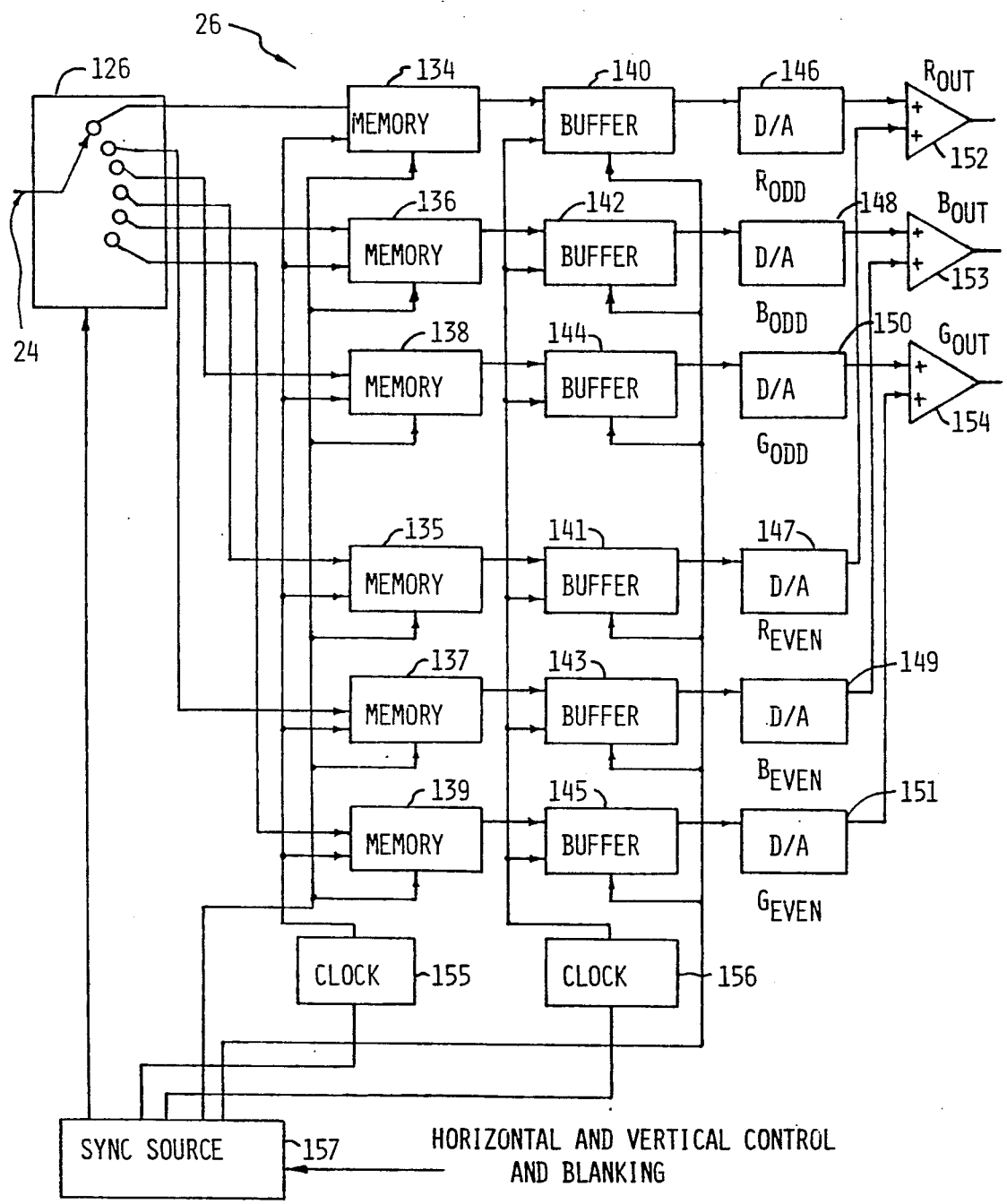
FIG. 3 is a block diagram of the inventive converter section of the inventive camera system.

In 1950, the Columbia Broadcasting System proposed a color television camera having only one pickup tube and a field sequential color television format. However, the FCC ultimately rejected this system in favor of the RCA simultaneous N.T.S.C. color system, despite superior image registration, stability, and color fidelity in the CBS system. The field sequential system employs time separation to maintain the independence of different color signal components. The television camera in this system is configured with a color wheel having red, blue and green filter sectors and which is placed between the camera lens and the single pickup tube. The color wheel is rotated at a speed synchronized with the scanning in the color camera tube to produce the required number of fields each second. A similar color filter wheel is rotated in front of a black-and-white television cathode ray tube and in synchronism with the camera's color wheel. The human eye sees the three time-separated primary images as one multicolor image.

In a field sequential system each red, blue and green color component occupies the full channel bandwidth since the information is presented sequentially. It follows that the field rate of a field sequential system is three times that of a conventional system to insure that all of the color information for a field is available at the same rate as a conventional system. Therefore, in a two-to-one interlace system, a total of 180 fields are required to maintain 60 fields per second in each of the three primary colors.

Unfortunately, along with its advantages, the field sequential system presents several obvious disadvantages. It is necessary to provide a color filter wheel at the television receiver that is more than twice the diameter of the television screen. This is obviously cumbersome and impractical for large diameter picture tubes. Accordingly, the field sequential system approach was abandoned by the industry.

Nevertheless, during the 1960's, in conjunction with the Apollo moon project, NASA employed a field sequential color camera on the moon. The field sequential color signal was transmitted back to earth and was also furnished to network television. Low field rates (ten per second) were necessary because of the restricted transmission band width of 1 MHz. The system operating parameters were 320 lines at 10 frames per second. The ground equipment used a magnetic disc operating at 1800 RPM to play back simultaneously three color components. Each frame was played three times to achieve thirty frames per second. Therefore, it was impossible to capture high quality video images of scenes that included fast moving objects. This system did not provide acceptable video images for normal commercial telecasting.

In contrast to the above, the instant invention includes a color television camera system that combines all of the advantages of the low light level pickup tube, field sequential color television system, and simultaneous color television system. In addition, all of the disadvantages discussed previously are not presented by the instant invention.

Thus, the invention is capable of producing high resolution, high quality color video images under reduced lighting conditions, and without supplementary lighting. It can operate at night using windows, or even the moon and stars. No cumbersome color wheel or additional equipment is required at each television receiver. Also, no additional equipment is required at the broadcast station. Moreover, full-motion video images are preserved.

Referring to FIG. 1, a low light level color camera system 10, according to the claimed invention is generally shown. Camera system 10 generates a color signal and converts it to simultaneous red, blue and green signals. Each signal is then processed as in a conventional color camera to produce the standard NTSC signal format for broadcasting.

A camera head 11 is shown comprising a known camera lens 12, a color filter wheel 13, a drive motor 14, and a drive shaft 15 attached to color filter wheel 13 at one end and to drive motor 14 at the other end. In principle, filter wheel 13 may be replaced by a so-called liquid crystal shutter, such as that marketed by Tektronix, Inc. of Beaverton, Oreg. There is also a low light level pickup tube 16 and a synchronization input circuit 17 for providing synchronization signals to pickup tube 16 and drive motor 14. In the case of very low light level operation, electrical shielding of tube 16 may be necessary. Synchronization input line 18 supplies horizontal and vertical scan control and blanking signals to input circuit 17.

Pickup tube 16 is optically aligned with camera lens 12 to receive, read and transform images at a predetermined field rate. Pickup tube 16 may be a SIT camera tube, SEC vidicon or image orthicon or isocon, or other camera tube types and may typically have an S-20 or similar spectral response.

Disposed between pick-up tube 16 and lens 12 is color filter wheel 13. Color filter wheel 13 contains several sets of three monochromatic filer sectors 13a in red, 13b in blue and 13c in green, all of equal area. For example, nine filter sectors disposed circumferentially in the order R, B, G, R, B, G, R, B, and G. Therefore, pickup tube 16 is in position to receive three distinct monochromatic color images of the targeted scene. Pickup tube 16 receives the red, blue and green images sequentially as color filter wheel 13 is made to rotate (in the instant example at 1200 revolutions per minute). The resulting signal, generated by pickup tube 16, is a field sequential color video signal.

Color filter wheel 13 is made to rotate, by means of drive motor 14 and drive shaft 15, at the appropriate rate (for example, in the case of a nine filter wheel, twenty revolutions per second). Therefore, each of its color filter sectors passes in front of pick up tube 16 for an interval of time of $1/180^{th}$ of a second (or 5.5 ms.). Thus, for each revolution of color filter wheel 13, pickup tube 16 receives, sequentially, three red, three blue and three green images.

When pickup tube 16 receives the three sequential monochrome images (in the above case of nine filter sections, over one third of a revolution of color filter wheel 13), it generates the previously described field sequential color video signal by scanning the entire face of the camera tube at a rate three times as fast as the color filter wheel rotation (e.g. at the rate of $1/180^{th}$ of a second).

Figure 5:
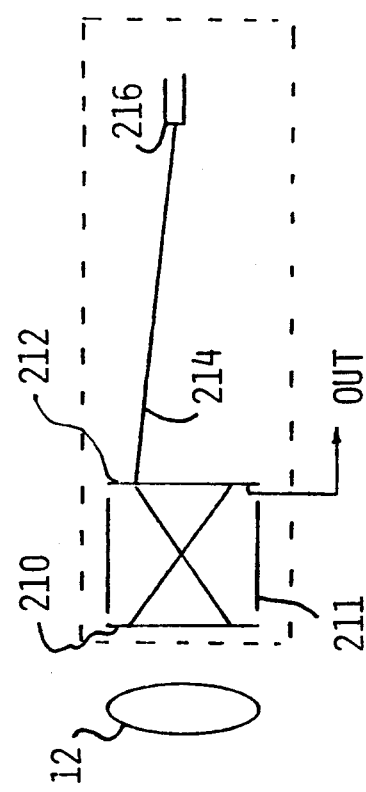
FIG. 5 illustrates a camera tube useful in the inventive system.

The details of construction of the tube 16 are illustrated in FIG. 5. While the invention may be implemented using any one of the various types of image intensifier camera tubes, some appreciation of the problems involve din such tubes may be understood by considering the operation of one such tube. A silicon intensified target tube, as illustrated in FIG. 5 comprises a photocathode 210 which receives an image from lens 12. Electrostatic means 211 are provided to accelerate and focus the photoelectron image formed on photocathode 210 toward silicon target 212. This photoelectron image on target 212 is greatly amplified due to the high gain of the intensifier which results from the acceleration of the high energy photoelectron image into the silicon target 212. This is the image intensifier section of a so-called S.I.T. tube. This electron image is scanned by an electron beam 214 emitted by electron gun 216 to produce an output signal from the silicon target. The image intensifier section of the S.I.T. tube is very sensitive to stray magnetic fields existing in its proximity due to power lines, electrical equipment and even the earth's magnetic field. These fields will prevent the achievement of acceptable registration of three S.I.T. tubes in a simultaneous color system.

It is also noted that the inventive system employing a camera tube and image intensifier may be yet further improved by putting two image intensifiers in tandem with each other and the camera tube. With such a tandem arrangement, it is possible not only to obtain television signals under starlight but even under cloud covered starlight. Of course, this tandem arrangement would only be used under the most demanding conditions, insofar as there is necessarily, a marked increase in the noise level of video signals produced.

In any case, it is noted that even with a conventional vidicon intensifier, improvements in sensitivity in the thousands are possible. This can be significantly increased with a tube which incorporates a silicon target, such as that illustrated in FIG. 5. Indeed, the great magnitude of the increase in performance is what makes use of multiple low light level image intensifier camera tubes impractical. Image shifting can occur as a result of even the weakest magnetic fields such as, for example, the earth's magnetic field. Powerlines, electronic equipment operating in the vicinity, and so forth increase the problem.

Thus, registration even with only these particular interferences would present a problem inasmuch as, if the shifts due to stray fields are in opposite directions the color images could be separated by a distance twice as great as the shift of one field of one color. However, when the tubes are put together, the registration problem is even greater as given deviations may be in opposite directions.

The signal produced by the system of FIG. 1 requires a bandwidth three times as large as the signal bandwidth from a conventional simultaneous color system, due to the fact that each red, blue and green signal component must have the video bandwidth of the simultaneous color system. Therefore the field sequential signal has a bandwidth of typically on the order of 15 to 30 MHz depending on the application. Each color signal component comprises a 262.5 horizontal line field, with a horizontal scan rate of approximately 47.250 MHz. The field rate (or vertical scan rate) is therefore approximately 180 Hz. This field rate is necessary in order to generate the red, blue and green signal components within a sixtieth of a second (i.e. the field rate of a simultaneous color system.)

The field sequential color video signal is produced at the output of camera head 11, and routed through a signal line 19 to a field sequential-to-simultaneous converter 20.

Converter 20 includes a sample-and-hold circuit 21, analog-to-digital converter 22, and data storage and control device 26. Signal line 19 is directly connected to the input of sample-and-hold circuit 21, which permits the field sequential signal to the sampled by sample-and-hold circuit 21. Sample-and-hold circuit 21 samples the signal at the Nyquist rate (twice the bandwidth), in this case, approximately 24 MHz. The output of sample-and-hold circuit 21 is directly connected to the input of analog to digital converter 22. Analog to digital converter 22 must be capable of a 24 MHz conversion rate to serially convert the video information. The analog-to-digital converter 22 is connected through a data line 24 to the input of data storage and control device 26. Digital representations of the analog signal samples are passed from analog-to-digital converter 22 to data storage and control device 26.

As will be discussed in greater detail with respect to FIG. 4, the output of data storage and control device 26 includes three parallel outputs, which also represent the outputs of converter 20. These outputs are provided for delivering a simultaneous color signal sent to a matrix adder circuit 34, through, respectively, a red video signal line 28, a blue video signal line 30, and a green video signal line 32. Each simultaneous color signal component has a bandwidth of about 5-10 MHz.

Matrix adder circuit 34 is well known in the color television camera art, and therefore its structure will not be described. The function of matrix adder circuit 34 is to transform the red, blue and green simultaneous color signals into three different signals, namely, brightness Y, hue I, and saturation Q. These signals are produced at the three outputs of matrix adder circuit 34, and are routed to an encoder and filter circuit 44, through, respectively, a signal line 38, a signal line 40, and a signal line 42.

Encoder and filter circuit 44 is also well known in the color television camera art, and therefore its structure will not be described. The function of encoder and filter circuit 44 is to provide a means for the hue and saturation signals to modulate a color subcarrier with a frequency of 3.579545 MHz. The color subcarrier is supplied to encoder and filter circuit 44 through signal line 46. The generation of this subcarrier is also well known. Encoder and filter circuit 44 does not substantially affect the brightness signal, except for amplification and band pass correction. At a single output of encoder and filter circuit 44, a final encoded signal, in the National Television System Committee (NTSC) format, is produced. This NTSC signal has a bandwidth of approximately 4 MHz.

Referring now to FIG. 4, data storage and control device 26 is illustrated in detailed functional block diagram form. Data line 24 in connected to a scanning switch 126 to permit the digitized samples or data of the field sequential signal to pass from analog to digital converter 22 to the various memories 134–139. Memories 134–139 each provide temporary storage and have a capacity to store enough data to comprise an entire field.

The outputs of memories 134–139 are connected, respectively, to the buffer memories 140–145, respectively. Buffer memories 140–145, in turn, drive digital-to-analog converters 146–151. The outputs of digital-to-analog converters 146 and 147 are then sent to an adder 152. In similar fashion the outputs of digital-to-analog converters 148 and 149 ar summed by adder 153 and the output of digital-to-analog converters 150 and 151 are summed by adder 154.

The speed at which information may be written into memories 134–139 and the speed at which information may be read from memory 134–139 is controlled by variable speed clock 155. In similar fashion, the rate at which information is written into and read from memories 140–145 is controlled by variable speed clock 156.

The speed of clocks 155 and 156 is varied in accordance with the point in the information processing sequence at which the system is at any given point in time by a synchronization source 157. Synchronization source 157 also controls the memory 134–139 and the buffer memory 140–145 to accept information for storage or output information. Also, synchronization source 157 controls scanning switch 126 to pass the given field to an appropriate memory.

The operation of synchronization source 157 may be most easily understood in connection with FIG. 4 which is a timing diagram of the system. As shown in FIG. 4(a), the field sequential color signal output by camera head 11 is illustrated. For purpose of illustration the length of the blanking period 158 has been greatly exaggerated in size with respect to the signal period 159. As can be seen in FIG. 5(a), the field sequential signal comprises an odd red field followed by an even blue field, followed by an odd green field, followed by an even red field, followed by an odd blue field, followed by an even green field which, in turn, is finally followed by a second odd red field to start the sequence again. This particular sequence is followed in order to accommodate the interlace spatial difference between the even and odd fields on the camera tube and a television receiver. As can be seen in FIG. 4(a), alternate odd and even fields are output by the camera, simplifying the electronics, and, at the same time, equal numbers of red, blue, and green fields are produced.

For purposes of clarity the various odd fields are illustrated as time blocks in FIG. 4(b). Likewise, the various even fields are illustrated as time blocks in FIG. 4(c). Thus, the time period during which an odd field must be stored is illustrated by the time blocks in FIG. 4(d). It is noted that the time begins with the beginning of the first odd red field and extends through the odd green field to the end of the odd blue field. The next time block during which odd fields are stored is labeled "store odd field three" inasmuch as field two is an even field, in the same manner as a conventional television picture.

Likewise, the time period during which even field are stored are illustrated in FIG. 4(e) and begins with the beginning of the even blue field and lasts through the even red field to the end of the even green field. As illustrated in FIGS. 4(d) and 4(e), the third and fourth field begin, respectively, at the beginning of the time period for the next odd red and the next even blue fields. There does exist a substantial gap of time between the periods of time in which adjacent odd or even fields are being stored.

Independent of the even fields sequences illustrated in FIG. 4(e), it is possible to read stored odd field sequences as soon as they are completed. Thus a short period of time after odd field one has been stored, the odd fields may be read from memories 134, 136, and 138. This is done during time period 160. Likewise, during time block 161 the even field is read from even memories 135, 137, and 139. These fields are read into buffers 140–145, and then played back in approximately a sixtieth of a second during the time blocks illustrated in FIG. 4(f) interlacing the odd and even fields. As soon as the odd field one has been read and output from the system, even field two has already been stored in the buffer memories and is ready to be output from the system during the time block illustrated in FIG. 4(f).

Considering the above described processing steps, reference is again made to FIG. 3 to explain the timing of the system. A field sequential video signal having the rate of 180 frames per second is input via line 24 into scanning switch 126 which is synchronized with the camera to sequentially send the odd red, even blue, odd green, even red, odd blue, and even green fields to their respective memories 134–139. This synchronization is achieved by driving synchronization source 157 with the same horizontal and vertical control and blanking signals which are used to control the scanning in the camera head 11. As these fields are sequentially stored in the odd red memory 134, the odd blue memory 136, and the odd green memory 138, these memories are being controlled by clock 155 at a rate corresponding to storage of the respective fields illustrated in FIG. 4(a) during the actual real time duration of the fields. Similarly, clock 155 controls memories 135, 137, and 139 in the same manner with respect to the even fields.

Once all of the odd fields have been stored in memories 134, 136, and 138, clock 155 is controlled by synchronization source 157 in order to send a higher clock frequency to memories 134, 136, and 138, to allow the odd fields from each of the three memories 134, 136, and 138 to be read into buffer memories 140, 142, and 144 during a very short period of time corresponding to interval 160 as illustrated in FIG. 4(d). The rate at which this information is written into memories 140, 142, and 144 is at a relatively high speed which is controlled by clock 156 which is instructed by synchronization source 157 to produce frequent clocking pulses for buffer memories 140, 142, and 144. After the three odd fields have been written into buffer memories 140, 142, and 144, it is then possible to read the memories during an interval of approximately a sixtieth of a second during the time block illustrated in FIG. 4(f).

In similar fashion even field two is loaded into buffer numbers 141, 143, and 145 during interval 161. It remains there until the beginning of the time block labeled "read even field 2" in FIG. 4(f), during which information is read from the buffer memories over a period of time approximately a sixtieth of a second in duration. Naturally, the clocking in of information at one speed into memories 135, 137, and 139, the clocking out of information from memories 135, 137, and 139 at a higher speed, the clocking of this information into buffer memories 141, 143, and 145 at this same higher speed and finally the clocking out of information from buffers 141, 143, and 145 in a sixtieth of a second (a relatively slow speed) is controlled by clocks 155 and 156 which respond to appropriate control signals from synchronization source 157, in the same manner as this information is processed through the odd memory/buffers circuits associated with the odd fields. Essentially, sychronization source 157 stores the timing and control information illustrated in FIG. 4.

As information is output from buffers 140-145 it must be converted from the digital form to the analog form. This is accomplished by digital-to-analog converters 146-151, respectively. The outputs of the digital-to-analog converters are then sent to adders 152-154. In particular, the odd and even red fields are combined by adder 152, the odd and even blue fields are combined by adder 153, and the odd and even green fields are combined by adder 154. Thus adders 152-154 present at their outputs simultaneous red, blue and green video signals suitable for conventional processing into the NTSC or any other format desired.

In accordance with an alternative embodiment of the invention, the blue filters may be removed from the color wheel which will result in less attenuation to the light since there are fewer filters in the system. With the blue filters removed, instead of generating a blue signal at line 30, a luminance signal will be generated and the blue color can be derived electronically.

More particularly, the color filter wheel of FIG. 2 has six filter segments, two red, two green, and two blue. Removal of the two blue filter segments and leaving the openings 413b clear, (FIG. 6) allows all the components of white light to pass through. The red light, through filter 413a green light through filter 413c and white light passing through the filter wheel makes it possible to obtain blue electronically. In particular, by electronically subtracting the red and the green from the open gate white light, we can derive the blue component. This will improve the camera's sensitivity by about 20% and additionally results in a high fidelity, extremely high definition luminance signal, which may be used to modulate the television carrier.

Figure 7:
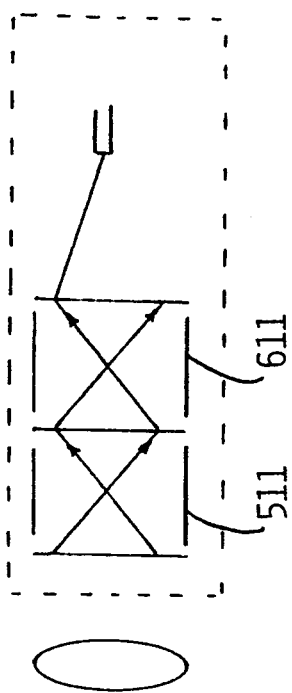
FIG. 7 illustrates a multi-level image intensifier tube.

FIG. 7 illustrates a multi-level image intensifier system useful in accordance with the present invention in much the same manner as the image intensifier system of FIG. 5. Here, however, instead of a single image intensifier stage, two stages are provided by a pair of accelerators 511 and 611.

While a illustrative embodiment of the present invention has been described, it is, of course, understood that various modifications will be obvious to those ordinary skilled in the art. Such modifications are within the spirit and scope of the invention which is limited and defined only by the appended claims.

I claim:

1. A color video system, comprising:
   (a) a lens for forming a real optical image;
   (b) a photosensitive surface positioned and dimensioned to receive said real optical image and to generate from said real optical image a photoelectron image comprising a plurality of photoelectrons;
   (c) a color filter for sequentially passing differently colored components of said real optical image;
   (d) a target positioned in facing spaced relationship to said photosensitive surface;
   (e) a photoelectron image accelerator for advancing said photoelectrons of said photoelectron image on said photosensitive surface toward said target to form an intensified electron image on said target;
   (f) a single electron beam scanner synchronized to said color filter for directly advancing a beam of electrons toward points of said intensified electron image on said target to convert said intensified electron image to a sequential color picture signal sequentially carrying different color components, the direction of said electron beam being varied with time to define a scanning pattern synchronized to said sequential passing of said color filter to generate said sequential color picture signal; and
   (g) a converter for converting said sequential color picture signal to simultaneous color picture signals.

2. A system as in claim 1, wherein said converter comprises:
   (h) a switch circuit for receiving said sequential color picture signal;
   (i) storage means for storing said sequential color picture signal in the form of fields of first, second, and third colors and for outputing simultaneous fields in said colors; and
   (j) a control circuit controlling said switch circuit to store said fields in said storage means in response to timing information contained in the output of said scanning means and controlling said storage means to output said simultaneous color picture signals.

3. A system as in claim 2, wherein each of said odd fields of the field sequential signal produced by said scanning means is written into its respective first memory during a respective first interval having a first duration each of said first intervals being separated by a blanking interval; said first, second, and third color odd color fields being read from said first memory and written into its respective buffer memory during a second interval beginning after three odd color fields, one for each of said colors, are stored, said second interval occurring during the blanking interval in an output simultaneous color signal at the system output said odd color fields stored in said buffer memories being simultaneously read from said buffer memories during a third interval, said third interval being longer than said first and second intervals, in response to control signals produced by said control circuit means, each of said even fields of the field sequential signal produced by said scanning means is written into its respective first memory during a respective fourth interval having a fourth duration each of said fourth intervals being separated by a blanking interval; said first, second, and third color even color fields being read from said first memory and written into its respective buffer memory during a fifth interval beginning after three even color fields, one for each of said colors, are stored, said fifth interval occurring during the blanking interval in an output simultaneous color signal at the system output, said even color fields stored in said buffer memories being simultaneously read from said buffer memories during a sixth interval, said sixth interval being longer than said fourth and fifth intervals, in response to control signals produced by said control circuit means.

4. A system as in claim 1, wherein said photoelectron image accelerator comprises a multi-stage cascade image intensifier.

5. A system as in claim 1, wherein said color filter is a rotating color filter wheel with red, blue and green segments, said color filter wheel being positioned between said lens and said photosensitive surface.

6. A system as in claim 1, wherein said color filter is a wheel with at least one color filter segment and an open segment which passes white light.

7. A system as in claim 1, wherein said color filter is a liquid crystal device whose color characteristics can be switched electrically.

8. A low light level color video system, comprising:
(a) optical means for forming an optical image;
(b) a photosensitive surface positioned and dimensioned to receive said optical image and to generate an electron image from said optical image;
(c) color selecting means disposed between said optical means and said photosensitive surface;
(d) target means in facing spaced relationship to said photosensitive surface;
(e) electron image accelerating means for advancing the electron image on said photosensitive surface toward said target means to generate an intensified electron image;
(f) scanning means for scanning said intensified electron image on said target means and for converting it to a color sequential electrical signal;
(g) switch means for receiving said color sequential electrical signal;
(h) storage means for storing said color sequential electrical signal in the form of fields of first, second, and third colors and for outputting simultaneous fields in said colors at respective outputs; and
(i) control circuit means for controlling said switch means and said storage means in response to timing information contained in said color sequential electrical signal to send simultaneous color signals to said outputs.

9. A system as in claim 8, wherein said switch means comprises (i) an analog-to-digital converter and further comprising a digital-to-analog converter associated with each of the outputs for each of said three colors.

10. A color video system, comprising:
(a) a lens for forming a real optical image;
(b) a photosensitive surface positioned and dimensioned to receive said real optical image and generating from said real optical image a photoelectron image comprising a plurality of photoelectrons;
(c) a color filter for sequentially passing differently color components of said real optical image;
(d) a target positioned in facing spaced relationship to said photosensitive surface;
(e) a photoelectron image accelerator for advancing said photoelectrons of said photoelectron image on said photosensitive surface toward said target to form an intensified electron image on said target;
(f) a single electron beam scanner synchronized to said color filter for directly advancing a beam of electrons toward points of said intensified electron image on said target to convert said intensified electron image to a sequential color picture signal sequentially carrying different color components, the direction of said electron beam being varied with time to define a scanning pattern synchronized to said sequential passing of said color filter to generate said sequential color picture signal, wherein each full frame of said scanning pattern has in excess of 1000 lines of image; and
(g) a converter for converting said sequential color picture signal to simultaneous color picture signals.

11. A color video system as in claim 1, wherein said color filter is a color filter wheel with color filter segments of different color characteristics, the movement of respective color filter segments being synchronized to the movement of said electron beam with one of said filter segments positioned to filter during one time period light corresponding to a locus of points of said target whose intensity is being converted by said electron beam, and another of said filter segments being positioned to filter light corresponding to said locus of points during another time period.

12. A color video system as in claim 8, wherein said color filter has effective color characteristics which are different at different times, changes in said effective characteristics being synchronized to the movement of said electron beam with one of said filter segments filtering during one time period, light corresponding to a locus of points of said target whose intensity is being converted by said electron beam, and filtering light corresponding to said locus of points differently during another time period.

* * * * *